US010368068B2

(12) United States Patent
Wennersten et al.

(10) Patent No.: US 10,368,068 B2
(45) Date of Patent: Jul. 30, 2019

(54) ENCODER AND METHOD FOR VIDEO PROCESSING

(71) Applicant: Telefonaktiebolaget LM Ericsson (publ), Stockholm (SE)

(72) Inventors: Per Wennersten, Årsta (SE); Jacob Ström, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 513 days.

(21) Appl. No.: 15/025,823

(22) PCT Filed: Oct. 1, 2013

(86) PCT No.: PCT/SE2013/051141
§ 371 (c)(1),
(2) Date: Mar. 29, 2016

(87) PCT Pub. No.: WO2015/050483
PCT Pub. Date: Apr. 9, 2015

(65) Prior Publication Data
US 2016/0234495 A1  Aug. 11, 2016

(51) Int. Cl.
*H04N 7/30* (2006.01)
*H04N 19/119* (2014.01)
*H04N 19/176* (2014.01)
*H04N 19/147* (2014.01)
*H04N 19/96* (2014.01)
(Continued)

(52) U.S. Cl.
CPC ......... *H04N 19/119* (2014.11); *H04N 19/126* (2014.11); *H04N 19/147* (2014.11); *H04N 19/176* (2014.11); *H04N 19/895* (2014.11); *H04N 19/96* (2014.11)

(58) Field of Classification Search
CPC .......................... H04N 19/119; H04N 19/126
See application file for complete search history.

(56) References Cited

U.S. PATENT DOCUMENTS

2012/0230411 A1  9/2012  Liu et al.
2013/0114692 A1* 5/2013  Sze ...................... H04N 19/176
                                                    375/240.03

OTHER PUBLICATIONS

Cho, Seunghyun et al., "Fast CU Splitting and Pruning for Suboptimal CU Partitioning in HEVC Intra Coding", IEEE Transactions on Circuits and Systems for Video Technology, vol. 23, No. 9, Sep. 2013, 1555-1564.

(Continued)

*Primary Examiner* — William C Vaughn, Jr.
*Assistant Examiner* — Jerry T Jean Baptiste
(74) *Attorney, Agent, or Firm* — Sage Patent Group (57) ABSTRACT

The embodiments relate to an encoder for encoding a bitstream representing a sequence of pictures of a video stream. The encoder is operative to divide the pictures into blocks of different types, such as coding units CUs, prediction units PUs, and transform units TUs, which are associated with each other. Two sizes are possible for the blocks and the possible combinations are restricted to three cases: 1) all blocks are of large size, 2) the CUs and PUs have large size, while associated TUs have small size, 3) all blocks are of small size. The possible combinations are defined for a part of a picture and compared against each other using a decision tree. In this way an advantageous block size configuration for encoding the bitstream is determined at a reduced computational cost.

11 Claims, 5 Drawing Sheets

(51) Int. Cl.
*H04N 19/126* (2014.01)
*H04N 19/895* (2014.01)

(56) References Cited

OTHER PUBLICATIONS

Tan, Hui Li et al., "On Fast Coding Tree Block and Mode Decision for High-Efficiency Video Coding (HEVC)", IEEE. Signal Processing Department, Institute for Infocomm Research, 1 Fusionopolis Way, #21-01 Connexis, South Tower, Singapore 138632. School of Electrical & Electronic Engineering, Nanyang Technological University, Singapore. Sep. 2012, 825-828.

Teng, Su-Wei et al., "Fast Mode Decision Algorithm for Residual Quadtree Coding in HEVC", Department of Electronics Engineering, National Chiao-Tung University, Hsinchu, Taiwan, Telecommunication Laboratories, Chunghwa Telecom Co., Ltd., Taoyuan, Taiwan, 1-4.

Zhang, Hao et al., "Early Termination Schemes for Fast Intra Mode Decision in High Efficiency Video Coding", IEEE, Mar. 2013, 45-48.

\* cited by examiner

ENCODER AND METHOD FOR VIDEO PROCESSING

TECHNICAL FIELD

The embodiments relate to video processing and in particular to a method and an encoder for making certain decisions for encoding in an efficient way.

BACKGROUND

In video processing, given an original uncompressed video, the purpose of a video encoder is to produce a compressed representation of the original video that is smaller in size but can be decompressed to produce a video closely resembling the original video. When designing an encoder, there is a trade-off between encoder complexity and compression efficiency: the more time an encoder has at its disposal, the more complex methods can be used for compression, the better its output will usually be for a given bitrate. In some applications, such as videoconferencing, it is useful to have an encoder working in real-time, making it challenging to achieve good compression.

High Efficiency Video Coding (HEVC), also referred to as H.265, is a video coding standard being developed in Joint Collaborative Team-Video Coding (JCT-VC). JCT-VC is a collaborative project between Moving Picture Experts Group (MPEG) and International Telecommunication Union-Telecommunication Strandardization Sector (ITU-T). Currently, an HEVC Model (HM) is defined that includes a number of tools and is considerably more efficient than the existing video coding standard H.264/Advanced Video Coding (AVC).

HEVC is a block-based hybrid video coded that uses both inter prediction (prediction from previous coded pictures) and intra prediction (prediction from previous coded pixels in the same picture). Each picture is divided into quadratic treeblocks (corresponding to macroblocks in H.264/AVC) that can be of size 16×16, 32×32 or 64×64 pixels. A variable CtbSize is used to denote the size of treeblocks expressed as number of pixels of the treeblocks in one dimension i.e. 16, 32 or 64.

Hence when encoding a frame of video with H.265, the frame is split into the treeblocks, each treeblock is then hierarchically split into Coding Units (CUs), ranging in size from 64×64 to 8×8 pixels.

Compressing a CU is done in two steps: first the pixel values in the CU are predicted from previously coded pixel values either in the same frame or in previous frames. After prediction, the difference between the predicted pixel values and the actual values is calculated and transformed.

Furthermore, prediction can be performed for an entire CU at once, or on smaller parts separately. This is done by defining Prediction Units (PUs), which may be the same size as the CU for a given set of pixels, or further split hierarchically into smaller PUs. Each PU defines separately how it will predict its pixel values from previously coded pixel values.

In a similar fashion, the transforming of the prediction error is done in Transform Units (TUs), which may be the same size as CUs or split hierarchically into smaller sizes. The prediction error is transformed separately for each TU.

A H.265 encoder can be implemented by restricting the size of the CUs, PUs and TUs so that they are all either 16×16 or 8×8 pixels. This gives 3 options for each 16×16 block of pixels:

1. 16×16 CU and PU with 16×16 TU,
2. 16×16 CU and PU with four 8×8 TUs or
3. four 8×8 CUs each with a single 8×8 PU and TU.

Figure 1:
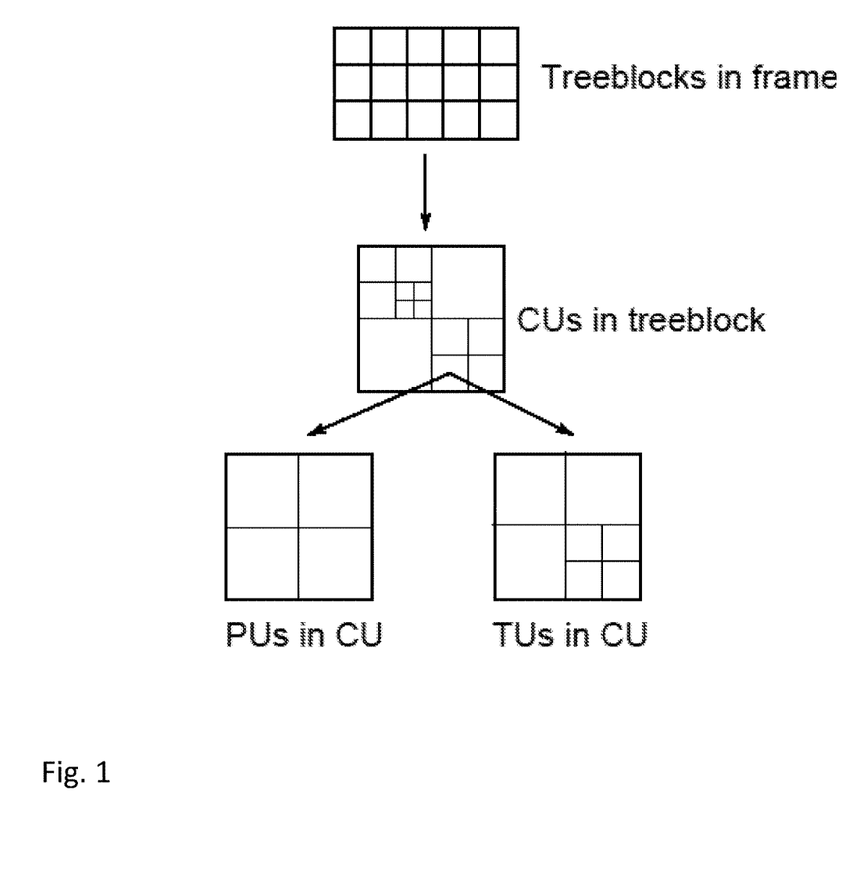
FIG. 1 is a diagram schematically showing the various block types used in H.265

Note that in all the above cases the CU is the same size as the PU. However, another combination of 16×16 and 8×8 blocks is possible for which this is not true: this is the case where the CU is one 16×16 block, the PUs are four 8×8 blocks and where the TU is a single 16×16 block. By disallowing this combination in the encoder, it is possible to use the simplifying assumption that the size of the PU is always the same as the size of the CU. The division of the treeblocks into CUs and PUs and TUs in the CUs is illustrated in FIG. 1.

The most straight-forward way of determining the size of CUs, TUs and PUs is to try different sizes, measure the amount of bits used and the error for each size, and choose the one which is best according to some metric. This is what, for example, the reference software for H.265 does.

A problem with the exemplified solutions above is that evaluating different block-sizes are costly. Evaluating just one transform unit size takes around 15% of the total encoding time. This means that evaluating two transform sizes would increase encoding time by around 15%, which is certainly a problem when fast encoding is a key requirement. Even worse, evaluating one prediction unit size takes around 30% of the total encoding time.

SUMMARY

The embodiments present ways of making certain decisions in the encoder much faster than with a typical solution according to prior art.

A method of quickly choosing a block size without fully evaluating all options is provided. This means that it is possible to get much of the benefit of having different block sizes, while increasing encoder complexity very little.

According to a first aspect of embodiments a method for encoding a bitstream representing a sequence of pictures of a video stream is provided. In the method, the pictures are divided into coding blocks of a first type. Each coding block of the first type is either of a first block size or a second block size, wherein said second block size is smaller than said first block size, and wherein each coding block of the first type is associated with at least one coding block of a second type of either said first block size or said second block size, and wherein each coding block of the first type is also associated with at least one coding block of a third type of either said first block size or said second block size.

A first combination of block sizes is defined for a part of the picture where the coding block of the first type, its at least one associated coding block of the second type and its at least one associated coding block of the third type are all of said first block size.

A second combination of block sizes is defined for said same part of the picture where the coding block of the first type and its at least one associated block of the second type are both of said first block size, and where all of said at least one coding block of the third type associated with the coding block of the first type are of said second block size.

Said first combination is compared against said second combination, and if it is determined that said first combination is better than said second combination, the method comprises, said first combination is selected for encoding the bitstream. Otherwise, it is defined for said same part of the picture a third combination of block sizes, where each coding block of the first type is either of said first or said second block size, all of said at least one coding block of the second type associated with each coding block of the first type are of said second block size, and where all of said at least one coding blocks of the third type associated with each coding block of the first type are also of said second block size.

Said second combination is compared against said third combination, and if it is determined that said second combination is better than said third combination, said second combination for encoding the bitstream is selected.

Otherwise, said third combination for encoding the bitstream is selected.

According to a second aspect an encoder for encoding a bitstream representing a sequence of pictures of a video stream is provided. The encoder comprises a processor and memory. Said memory contains instructions executable by said processor whereby said encoder is operative to divide the pictures into coding blocks of a first type. Each coding block of the first type being either of a first block size or a second block size, wherein said second block size is smaller than said first block size. Further, each coding block of the first type is associated with at least one coding block of a second type of either said first block size or said second block size, and wherein each coding block of the first type is also associated with at least one coding block of a third type of either said first block size or said second block size.

The encoder is further operative to define for a part of the picture a first combination of block sizes where the coding block of the first type, its at least one associated coding block of the second type and its at least one associated coding block of the third type are all of said first block size and to define for said same part of the picture a second combination of block sizes where the coding block of the first type and its at least one associated coding block of the second type are both of said first block size, and where all of said at least one coding block of the third type associated with the coding block of the first type are of said second block size.

Moreover, the encoder is operative to compare said first combination against said second combination, and to select said first combination for encoding the bitstream when it is determined that said first combination is better than said second combination.

The encoder is also operative to define for said same part of the picture a third combination of block sizes when it is determined that said first combination is not better than said second combination, where each coding block of the first type is either of said first or said second block size, all of said at least one coding block of the second type associated with each coding block of the first type are of said second block size, and where all of said at least one coding block of the third type associated with each coding block of the first type are also of said second block size.

The encoder is operative to compare said second combination against said third combination when it is determined that said first combination is not better than said second combination, to select said second combination for encoding the bitstream if it is determined that said second combination is better than said third combination, and to select said third combination for encoding the bitstream if it is determined that said second combination is not better than said third combination.

DETAILED DESCRIPTION

As stated above, a picture (also referred to as frame) in HEVC is split into treeblocks of size 16×16 pixels and these are split further into coding unit blocks (CUs) at the encoder. In order for the encoder to compress the CU, the CU can be further split into prediction units (PUs) and transform units (TUs) and the present embodiments relate to a method and an encoder for selecting suitable TU and PU block sizes (also referred to as size) e.g. in the context of HEVC.

Figure 2:
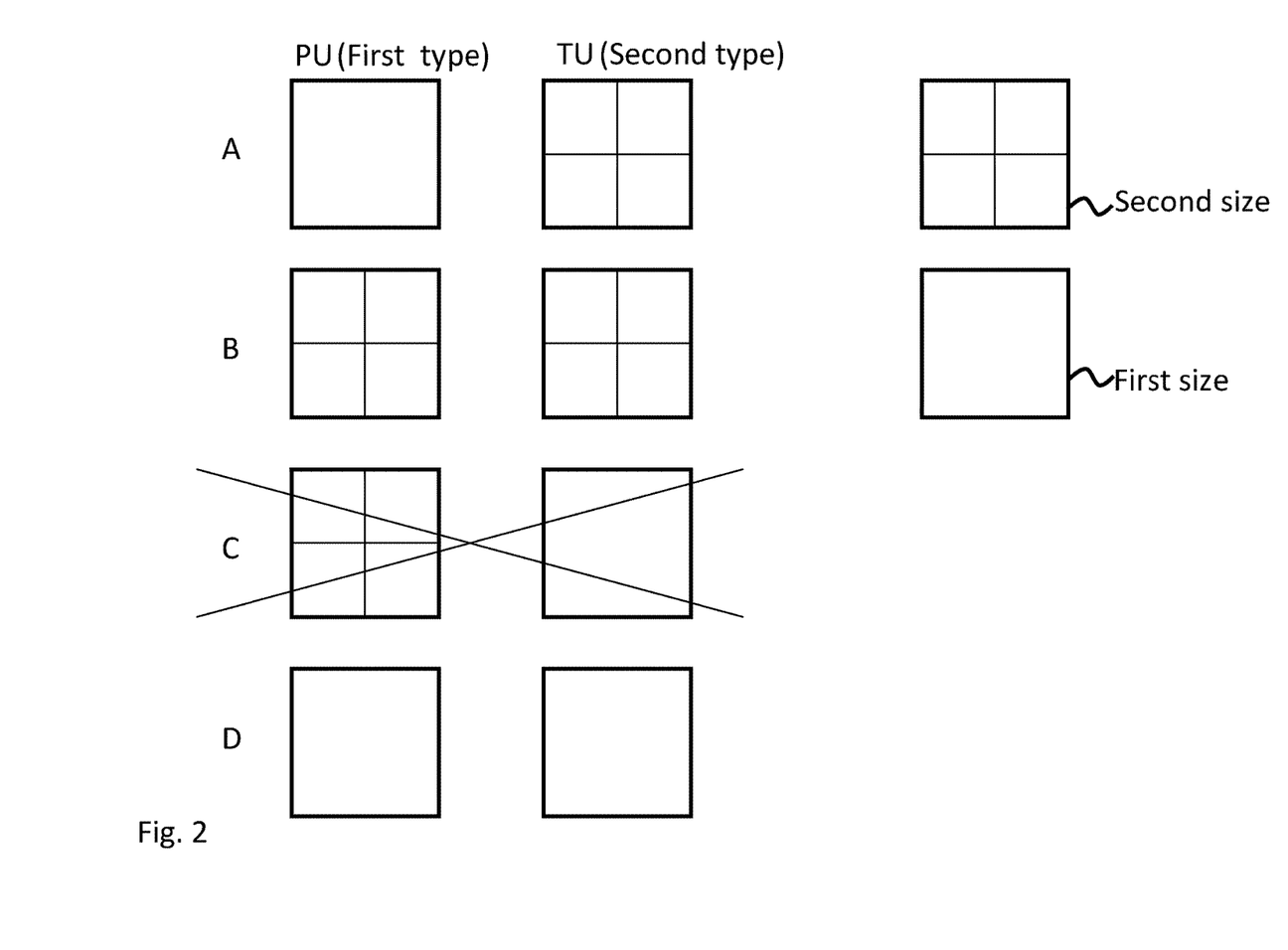
FIG. 2 illustrates schematically different combinations of TU and PU sizes.

With reference to FIG. 2, different combinations for TU and PU block size to be used by the encoder are shown. In combination denoted A, the PU has the same size as the CU and the TU is split further. In the combination denoted B, the CU has been split one step further, to four 8×8 blocks, and both the PUs and the TUs have the same size as the CUs (8×8). Note that the same sizes of the PU and TU blocks could have been obtained by having a 16×16 CU and subdivided both the PU and TU to four 8×8 blocks. However, for simplicity, we could use the same size for the CU as for the PU in order to avoid some test cases. E.g. consider the two cases:

x) A CU is a block of 16×16 pixels, a PU consists of four blocks of 8×8 pixels, a TU consists of four blocks of 8×8 pixels.

y) The same 16×16 area as above is covered by four CU blocks of 8×8 pixels, where each 8×8 block has a PU of 8×8 and a TU of 8×8.

When testing x and y, the results will be similar; Four predictions for the different 8×8 blocks will be performed and these will also have one transform. The only difference between x and y is the way they are signaled. For instance, for every new CU there is an opportunity to change the quantization parameter. Thus in case y it is possible to change the quantization parameter four times, whereas in case x the same quantization parameter must be used for the entire 16×16 area. However, such quantization parameter changes will be rare, and therefore there will not be a significant difference between the performance of x and y. By selecting that the CU size is equal to the PU size, the evaluation of the case referred to x can be avoided and only y could be evaluated. This would simplify the process.

According to the HEVC standard specification this combination denoted as C is possible, for instance if the CU size is 16×16, PU is divided into four 8×8 blocks and TU is not divided and hence 16×16 pixels. However, since the transform is used to correct the errors remaining after prediction, it does not make much sense to have a transform size that is spanning several prediction blocks. Hence, in the embodiments of the present invention, the combination C is regarded as not useful and therefore never tried. In combination denoted D both the PU and the TU have the same size as the CU. As an example the CU size is 16×16 pixels, which implies that a decision is made whether to use PUs and TUs with 16×16 pixels or 8×8 pixels.

Figure 3:
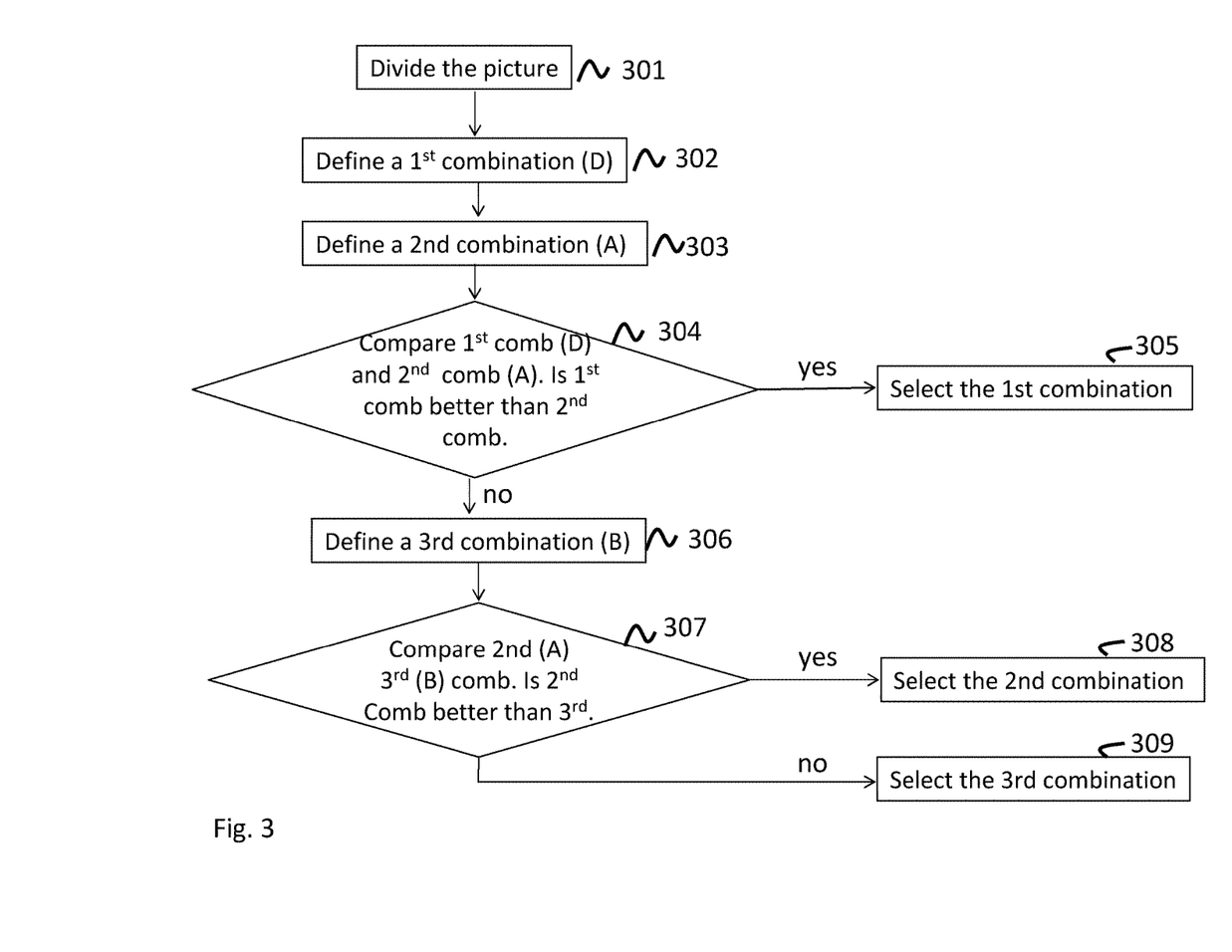
FIG. 3 is a flowchart of a method according to embodiments of the present invention.

In order to perform a fast and efficient decision of which PU and TU size to select, the following scheme is performed by an encoder as illustrated in the flowchart of FIG. 3. A bitstream, e.g. an HEVC compliant bitstream, is to be encoded that represents a sequence of pictures of a video stream. In a first step, the pictures are divided 301 into coding blocks of a first type, exemplified by coding unit (CU) blocks. Each CU block being either of a first block size or a second block size, wherein said second block size is smaller than said first block size. Further each CU block is associated with at least one coding block of a second type, exemplified by prediction unit (PU) block of either said first block size or said second block size, and wherein each CU block is also associated with at least one coding block of a third type exemplified by transform unit (TU) blocks of either said first block size or said second block size.

A first combination of block sizes (referred to as D in FIG. 2) is defined 302 for a part of the picture, where the CU block, its at least one associated prediction unit block and its at least one associated transform unit block are all of said first block size.

A second combination of block sizes (referred to as A in FIG. 2) is defined 303 for said same part of the picture, where the CU block and its at least one associated prediction unit block are both of said first block size, and where all of said at least one transform unit block associated with the CU block are of said second block size.

Said first combination is compared 304 against said second combination, and if it is determined that said first combination is better than said second combination, said first combination for encoding the bitstream is selected 305.

Otherwise, it is defined 306 for said same part of the picture a third combination of block sizes (referred to as B in FIG. 2). In the third combination, each CU block is either of said first or said second block size, all of said at least one prediction unit block associated with each coding block are of said second block size, and all of said at least one transform unit block associated with each CU block are also of said second block size.

Said second combination is compared 307 against said third combination, and if it is determined that said second combination is better than said third combination, said second combination for encoding the bitstream is selected 308.

Otherwise, said third combination for encoding the bitstream is selected 309.

As mentioned above, it is expensive to evaluate different block sizes and thus which combination of PU and TU size that would result in the best performance. By using the embodiment described above, where combination A and D always are compared first, the combination B does not have to be evaluated when combination D is better than A. This will save resources since A and D share the expensive part of such evaluations. In detail:

To evaluate D requires:
1) Predict the 16×16 pixel area from a previous image using one 16×16 PU (expensive)
2) Encode the prediction difference with a 16×16 TU
To evaluate A requires:
3) Predict the 16×16 pixel area from a previous image using one 16×16 PU (already done for D)
4) Encode the prediction difference with four 8×8 TUs
To evaluate B requires:
5) Predict the 16×16 pixel area from a previous image using four 8×8 PUs (expensive)
6) Encode the prediction difference with four 8×8 TUs (not the same as 4 above)

Thus, the evaluation of each combination requires a lot of processing. However, comparing A with D only requires three steps (1, 2 and 4) since step 3 is identical to step 1. In contrast, comparing B with either A or D would require four steps (1, 2, 5 and 6) or (3, 4, 5 and 6) which would be more costly, both in terms of number of expensive steps (two instead of one) and in terms of total number of steps (four versus 3).

The present invention starts by comparing A with D. Only if it is determined that A is better than D, the comparison between A and B is carried out. Thus, by using the embodiments of the present invention, the evaluation of B can often be avoided. Since D is often better than A, a comparison with B is quite unusual.

In addition the comparison of A and D can be made by using the method of annex A, which would make the evaluation of A and D even faster.

A measure dependent at least on distortion can be used for determining whether one combination is better than another. An example of such a measure is Rate Distortion (RD). For example a cost measure can be determined such as cost=Rate+λ·Distortion, wherein λ is a constant. The cost is determined for the evaluated combination and the combination with the lowest cost is selected. The distortion can be measured by summed squared error (SSE) or summed squared difference (SAD).

Figure 4:
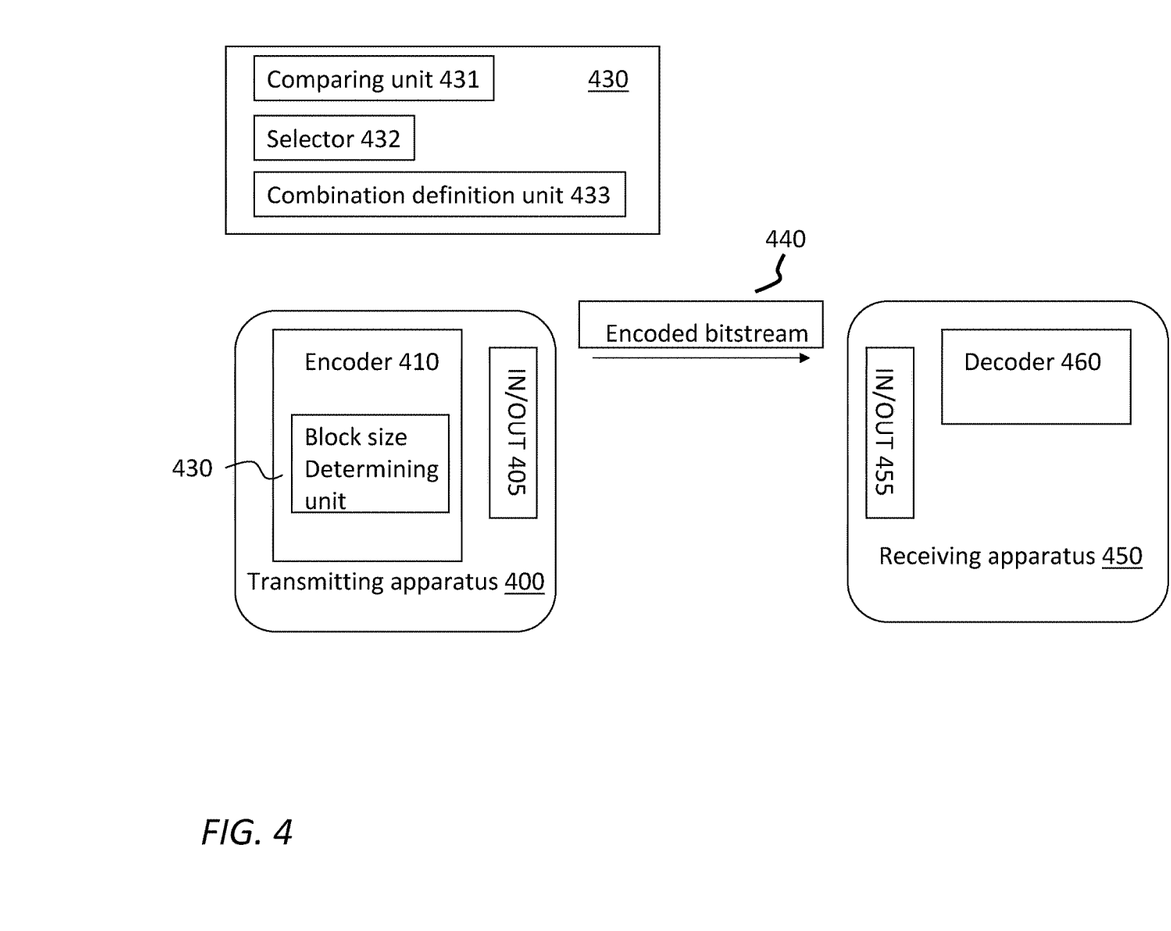
FIG. 4 illustrates schematically a transmitter implementing the embodiments of the present invention.

As illustrated in FIG. 4, an encoder is provided. A transmitting apparatus 400 comprises an encoder 410 for encoding a bitstream. The encoder comprises a block size determining unit 430, further comprising a comparing unit 431, a selector 432 and a combination definition unit 433 as illustrated in FIG. 4. The block size determining unit 430 is configured to divide the pictures into coding blocks of a first type, each coding block of the first type being either of a first block size or a second block size, wherein said second block size is smaller than said first block size. Each coding block of the first type is associated with at least one coding block of a second type of either said first block size or said second block size, and wherein each coding block of the first type is also associated with at least one coding block of a third type of either said first block size or said second block size. The combination definition unit 433 is configured to define for a part of the picture a first combination of block sizes where the coding block of the first type, its at least one associated coding block of the second type and its at least one associated coding block of the third type are all of said first block size and to define for said same part of the picture a second combination of block sizes where the coding block of the first type and its at least one associated coding block of the second type are both of said first block size, and where all of said at least one coding block of the third type associated with the coding block of the first type are of said second block size.

Further, the comparing unit 431 is configure compare said first combination against said second combination and the selector 432 is configured to select said first combination for encoding the bitstream when it is determined that said first combination is better than said second combination.

The combination definition unit is configured to define for said same part of the picture a third combination of block sizes. Each coding block of the first type is either of said first or said second block size, all of said at least one coding block of the second type associated with each coding block of the first type are of said second block size, and where all of said at least one coding block of the third type associated with each coding block of the first type are also of said second block size.

Moreover, the comparing unit 431 is further configured to compare said second combination against said third combination when it is determined that said first combination is not better than said second combination. The selector 432 is further configured to select said second combination for encoding the bitstream if it is determined that said second combination is better than said third combination, and to select said third combination for encoding the bitstream if it is determined that said second combination is not better than said third combination.

According to an embodiment, the coding block of the first type is a coding unit block, the coding block of the second type is a prediction unit block and the coding unit block of the third type is a transform unit block.

The encoded bitstream 440 representing the sequence of pictures having a determined combination of TU/PU sizes according to the embodiments is sent to a receiving apparatus 450 via respective in/out-put units 405,455. The receiving apparatus comprises a decoder for decoding/decompressing the received encoded bitstream. It should be noted that the transmitting apparatus and the receiving apparatus may be located within one apparatus such as a video camera with e.g. a video display or in a network node.

Figure 5:
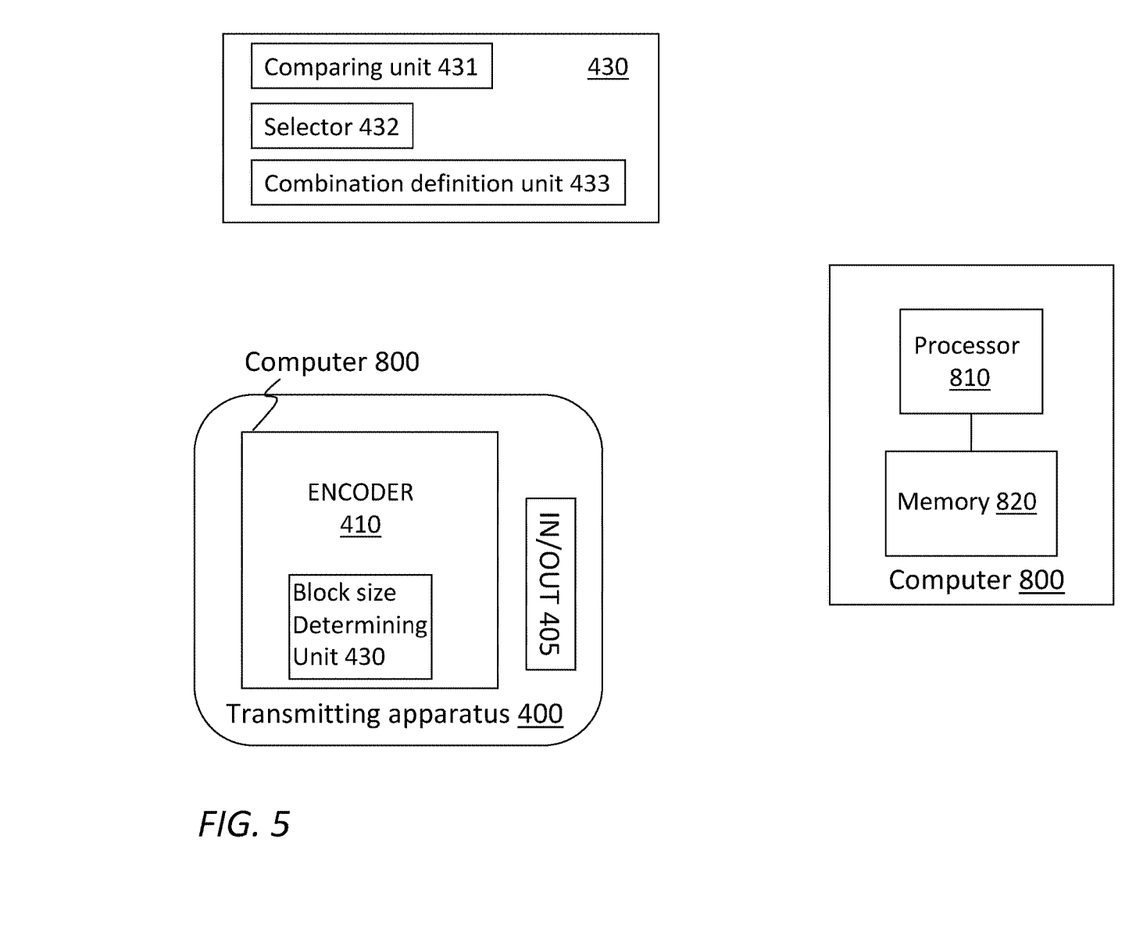
FIG. 5 illustrates schematically a computer implementation of the embodiments of the present invention.

Accordingly, a transmitting apparatus 400 for encoding a compliant bitstream representing a sequence of pictures of a video stream is provided as illustrated in FIG. 4. The transmitting apparatus 400 comprises as described above an encoder 410 and a block size determining unit 430. According to one implementation the encoder and the block size determining unit 430 are implemented by a computer 800 comprising a processor 810, also referred to as a processing unit and a memory 820 as illustrated in FIG. 5. Thus, the transmitting apparatus 400 according to this aspect comprises a processor 810 and memory 820. Said memory 820 contains instructions executable by said processor 810 whereby said block size determining unit 430 is operative to select PU and TU block sizes according to FIG. 3.

Therefore, an encoder for encoding an HEVC compliant bitstream representing a sequence of pictures of a video stream is provided, wherein the encoder comprises a processor and memory. Said memory contains instructions executable by said processor whereby said encoder is operative to divide the pictures into coding blocks of a first type exemplified by CU blocks. Each coding block of the first type being either of a first block size or a second block size, wherein said second block size is smaller than said first block size. Further, each coding block of the first type is associated with at least one coding block of a second type, exemplified by prediction unit block, of either said first block size or said second block size, and each coding block of the first type is also associated with at least one coding block of a third type, exemplified by transform unit blocks, of either said first block size or said second block size.

The encoder is further operative to define for a part of the picture a first combination of block sizes (exemplified by D in FIG. 2) where the CU block, its at least one associated prediction unit block and its at least one associated transform unit block are all of said first block size.

In addition the encoder is operative to define for said same part of the picture a second combination of block sizes (exemplified by A in FIG. 2) where the CU block and its at least one associated prediction unit block are both of said first block size, and where all of said at least one transform unit blocks associated with the CU block are of said second block size. The encoder is operative to compare said first combination against said second combination, and to select said first combination for encoding the bitstream when it is determined that said first combination is better than said second combination.

The encoder is operative to define for said same part of the picture a third combination of block sizes (referred to as B), where each CU block is either of said first or said second block size, all of said at least one prediction unit block associated with each CU block are of said second block size, and where all of said at least one transform unit blocks associated with each CU block are also of said second block size when it is determined that said first combination is not better than said second combination.

Moreover, the encoder is operative to compare said second combination against said third combination, and to select said second combination for encoding the bitstream if it is determined that said second combination is better than said third combination and to select said third combination for encoding the bitstream if it is determined that said second combination is not better than said third combination.

It should be noted that the embodiments are not limited to the division of the picture into CU, PU and TUs. The embodiments are also applicable to other encoding processes where similar division of the picture is performed.

Annex A

The embodiments described herein relates to video encoding and how to divide the pictures of a video stream into smaller blocks which are used for encoding. As mentioned above, a method of quickly choosing a block size without fully evaluating all options is provided.

Accordingly, the embodiments relate to a method for encoding a bitstream representing a sequence of pictures of a video stream as illustrated in FIG. 2*a*. The pictures are divided into units (e.g. coding units) which are further divided 202 into blocks 280 with a first size 250 e.g. 16×16 pixels, wherein the blocks can be divided further into four quarter blocks 270 with a second size 260 e.g. 8×8 as illustrated in FIG. 2*b*.

Hence, it is determined 204 if the units should be divided into blocks of the first size or quarter blocks of the second size to be used for encoding the unit. The determination 204 is made by calculating 210 a result of at least one comparison involving a scaled version of a first error measure associated with one of the quarter blocks, a scaled version of a second error measure associated with at least the remaining quarter blocks and a threshold C.

When at least one of said comparisons gives a Boolean result of a first kind, it is determined 214 that the unit could be divided into quarter blocks of the second size to be used for encoding the picture. The Boolean result of a first kind may be that the difference between a scaled version of the first error measure and a scaled version of the second error measure is larger than a threshold C.

When no one of said comparisons gives a Boolean result of a first kind, all of said comparisons give a Boolean result of a second kind. The Boolean result of the second kind is different from the first kind, wherein the Boolean result of the second kind is indicative of a difference being smaller than the Boolean result of the first kind, wherein said difference is the scaled version of the second error measure subtracted from the scaled version of the first error measure.

Hence when all of said comparisons give a Boolean result of a second kind different from the first kind, wherein the Boolean result of the second kind is indicative of a difference being smaller than the Boolean result of the first kind, wherein said difference is the scaled version of the second error measure subtracted from the scaled version of the first error measure it is determined 218 that the unit should be divided into blocks of the first size to be used for encoding the picture. The Boolean result of the second kind may imply that the difference between a scaled version of the first error measure and a scaled version of the second error measure is lower than a threshold C.

Accordingly, the determination 204 can be made by comparing at least a first error measure only associated with one of the quarter blocks with a second error measure associated with at least the remaining quarter blocks. When at least one difference between a scaled version of an error measure only associated with one of the quarter blocks and a scaled version of the second error measure is larger than a threshold C, it is determined that the unit could be divided into quarter blocks of the second size to be used for encoding the picture. I.e. as soon as there is at least one quarter block it can be decided that the blocks with the second size should be used or that the blocks with the second sized should be fully evaluated.

Thus, when no difference between a scaled version of an error measure only associated with one of the quarter blocks and a scaled version of the second error measure is larger than a threshold C, it is determined that the unit should be divided into blocks of the first size to be used for encoding the picture. That implies that none of the quarter blocks has an error measure, wherein the difference between the scaled version of the error measure only associated with one of the quarter blocks and a scaled version of the second error measure is larger than the threshold C.

It should be noted that the scaling of the first error measure may be different from or equal to the scaling of the second error measure. The scaling can be performed by multiplying an error measure by a constant, by multiplying each term in the error measure by a constant or e.g. by calculating the error measure for only a part of the pixels.

The comparing the at least a first error measure only associated with one of the quarter blocks with a second error measure associated with at least the remaining quarter blocks can be done by calculating 216 the first and second error measure by comparing a sum of squared differences, SSD, between predicted values and original values.

Accordingly, when the difference between the scaled version of the first error measure and the scaled version of the second error measure is not larger than the threshold C, this process is repeated for the other quarter blocks as long as the difference between the scaled version of the first error measure and the scaled version of the second error measure is not larger than the threshold C. As soon as the difference between the scaled version of the first error measure and the scaled version of the second error measure is larger than the threshold C, it is determined that the unit could be divided into quarter blocks of the second size to be used for encoding the picture.

When the difference between the scaled version of the first error measure and the scaled version of the second error measure is not larger than the threshold C, the determination is made by comparing a scaled version of a third error measure only associated with a second quarter block with a scaled version of a second error measure associated at least with the remaining quarter blocks.

When the difference between the scaled version of the third error measure and the scaled version of the second error measure is larger than the threshold C it is determined that the unit could be divided into quarter blocks of the second size to be used for encoding the picture.

When the difference between the scaled version of the third error measure and the scaled version of the second error measure is not larger than the threshold C, the determination is made by comparing a scaled version of a fourth error measure only associated with a third quarter block with a scaled version of a second error measure associated at least with the remaining quarter blocks.

When the difference between the scaled version of the fourth error measure and the scaled version of the second error measure is larger than the threshold C it is determined that the unit could be divided into quarter blocks of the second size to be used for encoding the picture.

When the difference between the scaled version of the fourth error measure and the scaled version of the second error measure is not larger than the threshold C, the determination is made by comparing 210 a scaled version of a fifth error measure only associated with a fourth quarter block with a scaled version of a second error measure associated at least with the remaining quarter blocks.

When the difference between the scaled version of the fifth error measure and the scaled version of the second error measure is larger 212 than the threshold C it is determined 214 that the unit could be divided into quarter blocks of the second size to be used for encoding the picture.

When the difference between the scaled version of the fifth error measure and the scaled version of the second error measure is not larger 212 than the threshold C it is determined 214 that the unit should be divided into blocks of the first size to be used for encoding the picture.

It should be noted that any scaling, including scaling with 1.0 could be used for the error measures and that the threshold could be any value and the scaling factors can be equal or different for the error measures. Moreover, the first quarter block could be any quarter block of the four quarter blocks. In addition, the comparison of the difference of the error measures with the threshold C could also be done by using larger than or equal to.

As an example, let the first error measure equal the summed squared difference (SSD) of the top left quarter of the block, and call it $SSD_{quarter1}$. Also let the second error measure equal the SSD of the entire block, and call it $SSD_{16\times16}$. Now, if indeed 16×16 is a good block size for this area, it can be assumed that the remaining error will be distributed quite evenly over the 16×16 pixels. Assume it is not; assume for instance that all the error is in the top left 8×8 pixels. Then it would most likely make sense to process this information differently from the other three quarters of the block; perhaps it needs a different motion vector for instance. Hence it makes sense to compare the SSD in the top left block (which is $SSD_{quarter1}$) with the error that would be the case if the error was perfectly evenly distributed over the 16×16 pixels, namely one fourth of $SSD_{16\times16}$. Thus we should compare the first error measure ($SSD_{quarter1}$) (scaled with 1) with the second error measure ($SSD_{16\times16}$) scaled with e.g. (¼). We could then test whether the difference $$SSD_{quarter1} - SSD_{16\times16}/4 > 0.$$

However, it may be the case that even a difference of zero may not be sufficient for it to be better to split the block. Hence a threshold is introduced, and only if the difference is larger than the threshold, the block is split:

$$SSD_{quarter1} - SSD_{16\times16}/4 > C.$$

This can be rewritten as $$SSD_{quarter1} - SSD_{16\times16}/4 + C.$$

Now, this formula is tried for more quarter blocks, i.e., first we try if $$SSD_{quarter1} - SSD_{16\times16}/4 + C.$$

If this is not the case, then we also try $$SSD_{quarter2} - SSD_{16\times16}/4 + C.$$

where $SSD_{quarter2}$ is the error measure associated with the top right corner. If this statement is also false, we try $$SSD_{quarter3} - SSD_{16 \times 16}/4 + C.$$

where $SSD_{quarter3}$ is the error measure associated with the bottom left corner. If this statement is also false, we finally try $$SSD_{quarter4} - SSD_{16 \times 16}/4 + C.$$

where $SSD_{quarter4}$ is the error measure associated with the bottom right corner. If this statement is also false, then we know that the error is rather evenly distributed throughout the block. Hence it is likely that 16×16 is a good block size in this case, and we can select this block size. However, if, for instance, $SSD_{quarter3} > SSD_{16 \times 16}/4+C$, returns true, we know that the error is not evenly distributed. In this case we do not need to test the fourth statement ($SSD_{quarter4} > SSD_{16 \times 16}/4+C$) since we already know that the error is unevenly distributed. In this case we can either go for a division into four 8×8 blocks or we can choose to calculate what the error would be if four 8×8 blocks would be used and compare that to $SSD_{16 \times 16}$. If the error would be sufficiently smaller to compensate for the extra bit-cost of splitting, we could choose the four 8×8 blocks. If the error would be larger, or not sufficiently smaller to compensate for the extra bit-cost of splitting, we would stick with the 16×16 block size.

Other scaling factors can be useful too. As an example, assume we want to investigate whether the following previous test holds:

$$SSD_{quarter1} - SSD_{16 \times 16}/4 + C.$$

The second error measure from $SSD_{16 \times 16}$ in this example is calculated over all 16×16 pixels. If we say that $SSD_{quarter1}$ is calculated over the top left 8×8 pixels, $SSD_{quarter2}$ is calculated over the top right 8×8 pixels, $SSD_{quarter3}$ is calculated over the bottom left 8×8 pixels and $SSD_{quarter4}$ is calculated over the bottom right 8×8 pixels, then it trivially holds that $$SSD_{16 \times 16} = SSD_{quarter1} + SSD_{quarter2} + SSD_{quarter3} + SSD_{quarter4}.$$

Inserting that to the inequality above gives $$SSD_{quarter1} > (SSD_{quarter1} + SSD_{quarter2} + SSD_{quarter3} + SSD_{quarter4})/4 + C$$

which is equivalent to the following inequality:

$$(3/4) * SSD_{quarter1} > (SSD_{quarter2} + SSD_{quarter3} + SSD_{quarter4})/4 + C.$$

Multiplying both sides with (4/3) gives $$SSD_{quarter1} > (SSD_{quarter2} + SSD_{quarter3} + SSD_{quarter4})/3 + (4/3)*C.$$

But we can now define a new second error measure $SSD_{192}$ which depends only on the three quarters of the block that is dashed in the right hand diagram in FIG. 2b. (We denote it here by 192 since it relies only on the 192 pixels that are dashed.) We can also introduce a new constant $K=(4/3)*C$ and we get $$SSD_{quarter1} > (SSD_{192})/3 + K.$$

As we can see now, we are back to the original test, where the difference of a first error measure ($SSD_{quarter1}$) and a scaled version of (scale factor is ⅓) of a second error measure ($SSD_{192}$) is compared to a threshold K.

Instead of comparing the difference between a first error measure and a scaled version of a second error measure, it is of course possible to compare scaled versions of both error measures. For instance, the above equation is equivalent of testing $$(3/4)*SSD_{quarter1} > (1/4)*(SSD_{192}) + C,$$

where both error measures are scaled.

It is also possible to put the scaling factor on the other error measure; the above equation is also equivalent to testing $$3*SSD_{quarter1} > SSD_{192} + K',$$

where $K'=3*K$.

In the above discussion we have first calculated aggregate error measurements such as $SSD_{192}$ and SSD 16×16 and then scaled the resulting value. As an example, the value $SSD_{192}$ can be calculated by summing the squared error between the original pixel intensity value Y and the approximate intensity value Y':

$$SSD_{192} = (Y_1 - Y'_1)^2 + (Y_2 - Y'_2)^2 + (Y_3 - Y'_3)^2 + \ldots + (Y_{192} - Y'_{192})^2.$$

This value is later scaled with (⅓). Sometimes however, it is advantageous to instead multiply the individual terms in the above equation:

$$SSD'_{192} = (1/3)*(Y_1 - Y'_1)^2 + (1/3)*(Y_2 - Y'_2)^2 + \ldots + (1/3)*(Y_{192} - Y'_{192})^2.$$

This alternative error measure $SSD'_{192}$ does not have to be scaled when performing the test $$SSD_{quarter1} > (SSD'_{192}) + K.$$

since this has already been done when computing the error measure, but it results in the same thing.

Calculating error measures exactly can involve a lot of arithmetical operations and can therefore be costly. For example to calculate $SSD_{16 \times 16}$ a total of 256 subtractions and squares have to be used, as well as additions:

$$SSD_{16 \times 16} = (Y_1 - Y'_1)^2 + (Y_2 - Y'_2)^2 + (Y_3 - Y'_3)^2 + \ldots + (Y_{256} - Y'_{256})^2.$$

Since luminance values that are close to each other are often similar, it may be sufficient to calculate, say, every second pixel, and assume that the neighboring pixel would result in a similar value. For instance, if we assume that all the odd values (such as $Y_1$ and $Y'_1$) are similar to all the even values ($Y_2$ and $Y'_2$ respectively), we can approximate $(Y_2 - Y'_2)^2$ by $(Y_1 - Y'_1)^2$ and $(Y_1 - Y'_1)^2 + (Y_2 - Y'_2)^2$ can be approximated by $2(Y_1 - Y'_1)^2$. So $SSD_{16 \times 16}$ can be approximated as $$SSD_{16 \times 16} \sim 2(Y_1 - Y'_1)^2 + 2(Y_3 - Y'_3)^2 + 2(Y_5 - Y'_5)^2 + \ldots + 2(Y_{255} - Y'_{255})^2$$

Let $SSD_{16 \times 16\_odd}$ be the error measure of the odd pixels:

$$SSD_{16 \times 16\_odd} = (Y_1 - Y'_1)^2 + (Y_3 - Y'_3)^2 + (Y_5 - Y'_5)^2 + \ldots + (Y_{255} - Y'_{255})^2.$$

We can now see that $SSD_{16 \times 16}$ can be approximated as $$SSD_{16 \times 16} \sim 2 SSD_{16 \times 16\_odd}.$$

If we instead take every fourth pixel we get that $$SSD_{16 \times 16} \sim 4 SSD_{16 \times 16\_every\_fourth}.$$

This then means that $(1/4)*SSD_{16 \times 16}$ can be approximated by $SSD_{16 \times 16\_every\_fourth}$.

Hence, in an alternate embodiment, it is possible to test the condition $$SSD_{quarter1} > SSD_{16 \times 16\_every\_fourth} + C$$

instead of $$SSD_{quarter1} > SSD_{16 \times 16}/4 + C.$$

In this case we have scaled the error measurement by using only every fourth pixel instead of using every pixel and dividing the resulting value by four.

Furthermore, the error measure does not need to be the summed square difference. An alternative is to use summed absolute difference:

$$SAD_{16\times16} = |Y_1 - Y'_1| + |Y_2 - Y'_2| + |Y_3 - Y'_3| + \ldots + |Y_{256} - Y'_{256}|,$$

where |·| denotes absolute value.

There are also other possible error measures and approximations of these error measures, such as errors taken to the fourth power $(Y_1 - Y'_1)^4$ etc.

Note that the scaling factor can be 1.0 and the constant C can be equal to 0. Hence, in one embodiment of the invention, testing if the difference between the first error measure and the scaled version of the second error measure is larger than a threshold can result in testing $$SSD_{quarter 1} > SSD_{16\times16}.$$

According to another embodiment, the scaling factor may be different from zero but the threshold may be zero. Hence, testing if the difference between the first error measure and the scaled version of the second error measure is larger than a threshold can be done by testing $$SSD_{quarter 1} > k * SSD_{16\times16}.$$

Where k is the scaling coefficient.

Furthermore, it is possible to make this scaling coefficient a function of the quantization parameter QP. In such an embodiment, the first error measure may be compared with the second error measure by using $$SSD_{quarter\ block\ 1} > f_1(QP) \cdot SSD_{block}$$

The first error measure is $SSD_{quarter\ block\ 1}$ and the second error measure is $SSD_{block}$ and wherein $SSD_{quarter\ block\ 1}$ is an the SSD for a first quarter block and $SSD_{block}$ is the SSD for at least the remaining quarter blocks, $f_1(QP)$ is a function of QP where QP is a quantization parameter. In this case, the threshold is zero and the scaling of the second error measure is done by multiplying $SSD_{block}$ with $f_1(QP)$. It should be noted that the $SSD_{quarter\ block\ 1}$ could be any of the four quarter blocks. The quantization parameter QP is a parameter controlling the quantization.

The first error measure may also be compared with the second error measure by using:

$$SSD_{quarter\ block\ 1} > f_1(QP) \cdot SSD_{block} + f_2(QP).$$

The first error measure is $SSD_{quarter\ block\ 1}$ and the second error measure is $SSD_{block}$ wherein $SSD_{quarter\ block\ 1}$ is the SSD for a first quarter block and $SSD_{block}$ is the SSD for at least the remaining quarter blocks, $f_1(QP)$ is a function of QP where QP is a quantization parameter and $f_2(QP)$ is another function of QP. $f_2(QP)$ is the threshold and the scaling of the second error measure is done by multiplying $SSD_{block}$ with $f_1(QP)$.

As an alternative, the first error measure may also be compared with the second error measure by using:

$SSD_{quarter\ block\ 1} > SSD_{block}/4 + f_2(QP).$ The first error measure is $SSD_{quarter\ block\ 1}$ and the second error measure is $SSD_{block}$ wherein $SSD_{quarter\ block\ 1}$ is the SSD for the first quarter block and $SSD_{block}$ is the SSD for at least the remaining quarter blocks, and $f_2(QP)$ is a function of QP. $f_2(QP)$ is the threshold and the second error measure is scaled by ¼.

The first size, i.e. the size of the blocks may be 16×16 pixels and the second size, i.e. the size of the quarter blocks may be 8×8 pixels. Further, the blocks and quarter blocks are transform units or prediction units. The bitstream can be encoded according to HEVC or H.264 but the embodiments are not limited to HEVC or H.264.

The embodiments above are further exemplified below where blocks of size 16×16 have been used. In this case, the objective is to decide whether to use a single 16×16 transform or to use four 8×8 transforms. As described earlier, it is not desired to evaluate both options since that is too time consuming, instead it is advantageous to be able to choose a size quickly and then perform the appropriate transforms.

In order to make the decision whether to use a single 16×16 transform or to use four 8×8 transforms, first the pixel values in the block are predicted. Then the sum of squared differences (SSD) between our predicted values and the original ones for the 16×16 block are calculated, and separately for its four 8×8 quarters.

Once this has been done it is checked, for each quarter, if the difference between the scaled version (scaling with 1) of the first error measure and the scaled version of the second error measure is larger than a threshold C e.g. by using $SSD_{quarter} > SSD_{16\times16}/4 + C$. C in this example is a constant that is set to $2^{QP/3}$, where QP is a quantization parameter used in video coding to govern the quality level, with low QP resulting in higher quality.

If a quarter meets the criteria, we surmise that the error is unevenly distributed and 8×8 transforms would be more suitable for the block. If no quarter fulfills the criteria, we apply a 16×16 transform.

The use of QP as part of the decision means that high quality encodings will get low values of C and therefore almost exclusively use 8×8 transforms, and low quality encodings get high values of C and almost always use the cheaper 16×16 transforms.

In another example, the objective is to decide whether to use 16×16 or 8×8 PUs (prediction units). In order to do this, we first do an evaluation of the full 16×16 block. We then want to evaluate the four 8×8 quarters to determine which size to use, but this is deemed too expensive. In order to reduce the complexity cost, we opt to only perform this full evaluation and comparison of the two sizes for some of the blocks. We to this using the same formula as above: we calculate the SSDs and check whether $SSD_{quarter} > SSD_{16\times16}/4 + C$ for any of the four quarters. If so, we check if using PUs with a size of 8×8 pixels is better.

Note that for transform units (TUs), we may simply choose a size based on the formula, whereas for PUs we may use the formula merely to decide whether to evaluate the smaller size. This is because we need to evaluate at least one PU size in order to calculate the SSDs. If we already have evaluated 16×16 PUs and then determine that 8×8 might be better, it makes more sense to evaluate it and compare the two than to blindly use 8×8. So for PUs, the determining that the unit should be divided into quarter blocks of the second size to be used for encoding the picture, implies that the quarter blocks of the second size are evaluated before taking the final decision on the block sizes.

Accordingly, the blocks and the quarter blocks may be transform units (TUs) or prediction units (PUs).

The method according to the embodiments described above is performed by an encoder, e.g. an HEVC encoder.

The invention claimed is:

1. A method for encoding a bitstream representing a sequence of pictures of a video stream comprising:
   dividing the pictures into coding blocks of a first type, each coding block being either of a first block size or a second block size, wherein said second block size is smaller than said first block size, and wherein each coding block of the first type is associated with at least one coding block of a second type of either said first block size or said second block size, and wherein each coding block of the first type is also associated with at least one coding block of a third type of either said first block size or said second block size;

defining for a part of the picture a first combination of block sizes where the coding block of the first type, its at least one associated coding block of the second type and its at least one associated coding block of the third type are all of said first block size;

defining for said part of the picture a second combination of block sizes where the coding block of the first type and its at least one associated coding block of the second type are both of said first block size, and where all of said at least one coding block of the third type associated with the coding block of the first type are of said second block size;

comparing said first combination against said second combination and, based on said comparing, determining whether to select said first combination of block sizes for encoding the bitstream without further evaluation or select from between the second combination and a third combination of block sizes, wherein said determining comprises determining to select the first combination for encoding the bitstream with further evaluation in an event that said first combination is better than said second combination with respect to number of bits for encoding or coding error, or both and otherwise determining to select between the second and third combinations of block sizes for encoding the bitstream.

2. The method of claim 1, wherein the coding block of the first type is a coding unit block, the coding block of the second type is a prediction unit block and the coding block of the third type is a transform unit block.

3. The method of claim 1, wherein the first block size is 16.times.16 pixels and the second block size is 8.times.8 pixels.

4. The method of claim 1, wherein the comparing is performed by using a measure at least depending on a distortion.

5. An encoder for encoding a bitstream representing a sequence of pictures of a video stream, the encoder comprises a processor and memory, said memory containing instructions executable by said processor whereby said encoder is configured to:

divide the pictures into coding blocks of a first type, each coding block of the first type being either of a first block size or a second block size, wherein said second block size is smaller than said first block size, and wherein each coding block of the first type is associated with at least one coding block of the second type of either said first block size or said second block size, and wherein each coding block of the first type is also associated with at least one coding block of a third type of either said first block size or said second block size;

define for a part of the picture a first combination of block sizes where the coding block of the first type, its at least one associated coding block of the second type and its at least one associated coding block of the third type are all of said first block size;

define for said same part of the picture a second combination of block sizes where the coding block of the first type and its at least one associated coding block of the second type are both of said first block size, and where all of said at least one coding block of the third type associated with the coding block of the first type are of said second block size;

compare said first combination against said second combination and, based on the comparison, determine whether to select said first combination of block sizes for encoding the bitstream without further evaluation or select from between the second combination and a third combination of block sizes, wherein the encoder is configured to determine to select said first combination for encoding the bitstream without further evaluation in an event that said first combination is better than said second combination with respect to number of bits for encoding or coding error, or both and otherwise to determine to select between the second and third combination of block sizes for encoding the bitstream.

6. The encoder of claim 5, wherein the coding block of the first type is a coding unit block, the coding block of the second type is a prediction unit block and the coding unit block of the third type is a transform unit block.

7. The encoder of claim 5, wherein the first block size is 16.times.16 pixels and the second block size is 8.times.8 pixels.

8. The encoder of claim 5, wherein the encoder is configured to compare by using a measure at least depending on a distortion.

9. The encoder of claim 5, wherein the encoder is a High Efficiency Video Coding (HEVC) encoder.

10. The method of claim 1, wherein said determining whether to select said first combination of block sizes for encoding the bitstream or select from between the second and third combination of block sizes for encoding the bitstream comprises determining to select between the second and third combinations of block sizes for encoding the bitstream, and wherein the method further comprises:

defining for said same part of the picture the third combination of block sizes, where each coding block of the first type is either of said first or said second block size, all of said at least one coding block of a second type associated with each coding block are of second block size, and where all of said at least one coding blocks of third type associated with each coding block of the first type are also of said second block size, comparing said second combination against said third combination and, based on the comparison of said second combination against third combination, determining whether to select the second combination or third combination, wherein determining whether to select the second combination or third combination comprises selecting the second combination for encoding the bitstream in the event that the second combination is better than the third combination with respect to number of bits for encoding or coding error, or both and otherwise selecting the third combination for encoding the bitstream.

11. The encoder of claim 5, wherein the encoder is further to, in the event that the encoder determines to select between the second and third combinations of block sizes for encoding the bitstream:

define for said same part of the picture the third combination of block sizes, where each coding block of the first type is either of said first or said second block size, all of said at least one coding block of a second type associated with each coding block are of said second block size, and where all of said at least one coding blocks of the third type associated with each coding block of the first type are also of said second block size, compare said second combination against said third combination and, based on the comparison of said second combination against third combination, determine whether to select the second combination or third combination by selecting the second combination for encoding the bitstream in the event that the second combination is better than the third combination with respect to number of bits for encoding or coding error, or both and otherwise selecting the third combination for encoding the bitstream.

* * * * *